July 31, 1962 R. R. BROWN ET AL 3,047,839
TRAILER HITCH SAFETY DEVICE
Filed Dec. 2, 1959

INVENTORS
Raymond R. Brown
Donald D. Goff

United States Patent Office 3,047,839
Patented July 31, 1962

3,047,839
TRAILER HITCH SAFETY DEVICE
Raymond R. Brown, Box 336, Copan, Okla., and Donald D. Goff, Bartlesville, Okla., assignors to Raymond R. Brown
Filed Dec. 2, 1959, Ser. No. 856,865
7 Claims. (Cl. 340—52)

This invention relates to an improvement in trailer hitches. More specifically this invention of a safety device used to warn the operator of a vehicle pulling a trailer when the trailer is in danger of becoming uncoupled from the pulling vehicle.

More specifically this invention covers a safety attachment which can be used with all trailer hitches and couplers.

The safety device is mounted on the plate that is normally attached to the towing vehicle, and is positioned directly ahead of the ball or at an angle to the longitudinal center line of the hitch plate and ball. When this invention is used before the trailer coupler can be set on or taken off the ball the safety device's arm must be rotated approximately ninety degrees to allow the coupler clearance. After the coupler is secured on the ball the safety device's arm is rotated ninety degrees to be positioned on top of the coupler. A detent means is provided in the mounting block of the safety device to hold the arm over the coupler.

A minimum of clearance is provided between the under side of the safety device's arm and the top of the coupler. An electrical switch is positioned in the safety device's arm with the contact mounted on the under side of the arm.

Should the coupler's latching system malfunction or become loosened from around the ball the arm of the safety device will prevent the coupler from bouncing off the ball. The upward motion of the loosened coupler due to road bouncing will close the electrical contacts in the arm and operate a warning device mounting in the towing vehicle.

It is an object of this invention to provide an improved trailer hitch safety device which in addition to impeding accidental uncoupling the coupler from the hitch, will warn the operator of the towing vehicle of danger. It is a further object to provide a warning device to be used with trailer hitches and couplers. It is a further object to provide a safe trailer hitch which is economical to manufacture and service. It is a further object to provide an improved safe trailer hitch which reduces danger to traffic, trailers, and towing vehicles when traveling at high speeds. Other objects and benefits of this invention will be readily recognized by one skilled in the automotive art.

Figure 1:
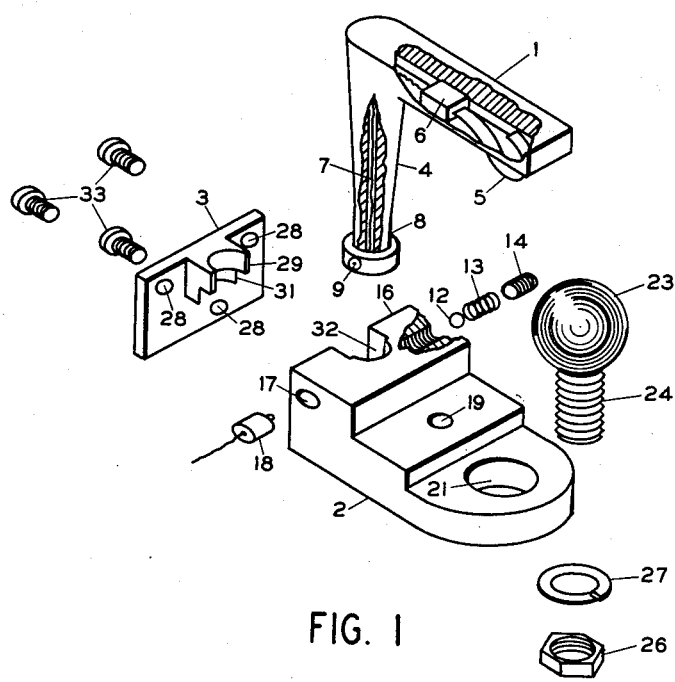
FIG. 1 is a view showing all the parts of the present invention.

Referring to the figures 1 denotes the arm of this safety device. Arm 1 consists of the arm proper and forms a single unit consisting of an upright stem 4 and attached to a pivot disk 8 the purpose of which will become apparent below. The horizontal portion of 1 has a recessed under section in which is placed switch 5 and switch mount 6 connected to electrical lead 7 which passes through a drilled hole in 4. Lead 7 is connected to insulated contact 9 in pivot disk 8. An indention is drilled into disk 8 at a position 180 degrees to contact 9 to form a part of a locking detent into which ball 12 is urged by spring 13, held in place by screw 14 of base 2.

Base 2 is machined in block 16 at 32 to receive pivot disk 8. Pivot disk 8 is held in place by means of backing plate 3. Backing plate 3 mounts extensions 29 and 31 which fit in 32 around stem 4 and pivot disk 8. Backing plate 3 is attached to and held in place against 2 by means of screws 33 which pass through holes 28 in 3.

A spring loaded electrical contact 18 is inserted in drilled hole 17 in 2 and held in place by threads or epoxy resin, and makes contact with insulator 9 mounted in disk 8. Base 2 mounts two drilled holes 19 and 21. 19 is used for mounting 2 to towing vehicle plate 41. Stud 24 attached to ball 23 passes through hole 21 and through a mating hole in plate 41. Nut 26 and washer 27 are used with stud 24.

Figure 2:
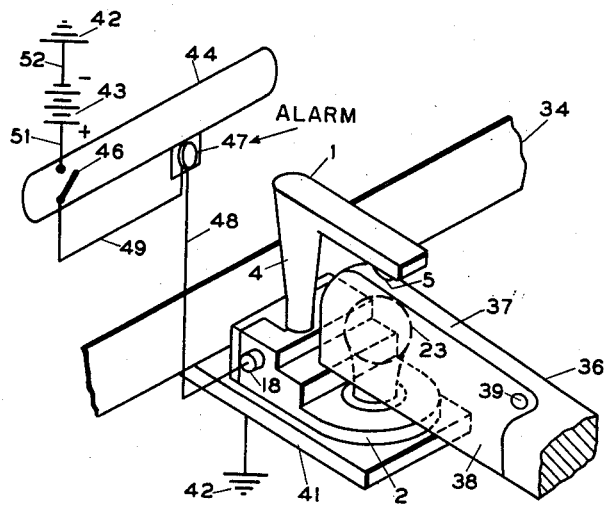
FIG. 2 shows the present invention used with a trailer hitch attached to a towing vehicle and coupler. This figure also shows a schematic of the electrical circuit of the present invention.

In FIG. 2 base 2 is shown mounted on plate 41 which is attached to a rear portion of a towing vehicle 34. The coupler 36 is shown attached to ball 23 by means of its split section made up of two sections 37 and 38 with 38 being hinged by hinge bolt 39. Conventional means (not shown) may be used to hold the hinged portions 37 and 38 together.

Ground 42 forms one electrical path for current in the electrical alarm system. The other path is from switch 5, through lead 7, contact 9, spring loaded contact 18, lead 48, alarm 47, lead 49, ignition key operated switch 46, lead 51, battery 43, and lead 52 to ground. The circuit is completed to ground when switch 5 is caused to touch arm 1.

In operating this invention arm 1 is rotated 90 degrees during the time coupler 36 is being attached to ball 23. It is obvious in this position that spring loaded switch 18 will be urged against disk 8 when insulated contact 9 is moved a minimum of 10 degrees and the alarm will be actuated if the ignition switch 46 is closed. Normally switch 46 is not closed during the coupling process, but becomes closed when the ignition switch is operated and the alarm 47 will operate before moving the trailer, should arm 1 be left out of its longitudinal protective position, since contact 18 grounds against disk 8. While the towing vehicle is moving, should coupler 36 become loosened it will bounce upward causing switch 5 to make contact with arm 1 resulting in operation of the alarm 47. Any actuation of alarm 47 indicates an unsafe operating condition of the trailer hitch and coupler.

Obvious modifications can be made in this apparatus without departing from our invention.

We claim:

1. A trailer hitch for connecting a towing vehicle and a towed vehicle by means of a coupler and mating ball on said hitch comprising the combination of a base mounted on a backing plate attached by screws to said towing vehicle, said base and said backing plate having a cylindrical recessed portion for mounting a unit formed by a vertically positioned pivot stem and disk with an arm connected to and at right angles with said pivot stem and disk, said arm containing an electrical switch one terminal of which is grounded, the other terminal of said switch being connected by an insulated electrical lead which passes through said arm, said pivot stem and disk to an electrically insulated contact in said disk, a spring biased electrical contact in said base and touching said insulated contact when said arm is positioned longitudinally with said hitch, and electrically connected to an alarm, manually operated electrical switch, and source of current to ground, said alarm being supplied current by said source and actuated when said arm is rotated causing said spring biased switch to become grounded to said disk, said arm being maintained in a longitudinal position by a detent mounted in said base and extending into a recessed portion of said disk.

2. The device of claim 1 in which the backing plate mounts a cylindrical bifurcated extension which locks said stem and disk in said base.

3. A trailer hitch for connecting a towing vehicle to a towed vehicle by means of a coupler and mating ball on said hitch comprising the combination of a base mounted on a backing plate attached by bolts to said towing vehicle, said base and said plate having a cylindrical recessed portion for mounting a unit formed by a vertical positioned pivot stem and disk with an arm connected to and at right angles with said pivot stem and disk, said arm containing an electrical switch one terminal of which is grounded, the other terminal of said switch being connected by an insulated electrical lead which passes through said arm, said pivot stem and disk to an electrically insulated contact along the circumference of said disk, a spring biased electrical contact in said base and touching said insulated contact when said arm is positioned longitudinally with said hitch, and electrically connected to an alarm, manually operated, electrical switch, and source of current to ground, said alarm being supplied current by said source and actuated when said coupler becomes moved vertically upward causing grounding of the electrical switch in said arm.

4. The device of claim 3 in which said backing plate is attached to said base by means of bolts extending through said backing plate and said base.

5. The device of claim 3 in which the base is attached to said backing plate by bolts and the stud attached to said mating ball.

6. A trailer hitch safety device comprising in combination a base mountable upon the plate of a trailer hitch attached to a towing vehicle, said base and a backing plate having a cylindrical recessed portion for mounting a unit formed by a vertically positioned pivot stem and disk with an arm connected to and at right angles with said pivot stem and disk, said arm containing an electrical switch one terminal of which is grounded, the other terminal of said switch being connected by an insulated electrical lead passing through said arm, said pivot stem and disk to an electrically insulated contact in said disk, a spring biased electrical contact in said base and touching said insulated contact when said arm is positioned longitudinally with said hitch, and electrically connected to an alarm, manually operated electrical switch, and source of current to ground, said alarm being supplied current by said source and actuated when said coupler is moved vertically upward causing grounding of the electrical switch in said arm.

7. The device of claim 6 in which said alarm is actuated when said arm is rotated about the pivot stem's vertical axis and said spring biased contact grounds to said disk supplying current to said alarm through said electrical leads.

No references cited.